United States Patent [19]
Onlin et al.

[11] Patent Number: 5,238,543
[45] Date of Patent: Aug. 24, 1993

[54] RECOVERY OF SILVER FROM PHOTOGRAPHIC FILM AND PHOTOGRAPHIC DEVELOPMENT WASTE SOLUTION

[75] Inventors: Tyngbin Onlin; Jeng-Shyong Jean; Pak-Hing Lee; Tei-Chih Cheau, all of Hsinchu, Taiwan

[73] Assignee: Industrial Technology Research Institute, Hsinchu, Taiwan

[21] Appl. No.: 880,237

[22] Filed: May 8, 1992

[51] Int. Cl.$^5$ ............................................. C25C 1/00
[52] U.S. Cl. ................................. 204/109; 204/105 R
[58] Field of Search .............. 204/109, 105 R; 423/27; 430/398, 399, 400; 75/713

[56] References Cited

U.S. PATENT DOCUMENTS

| | | | |
|---|---|---|---|
| 4,317,707 | 3/1982 | Good et al. | 204/271 |
| 4,612,057 | 9/1986 | Buser et al. | 134/13 |

Primary Examiner—John Niebling
Assistant Examiner—Patrick J. Igoe
Attorney, Agent, or Firm—W. Wayne Liauh

[57] ABSTRACT

A process which incorporates the recovery of silver from photographic film into the recovery of silver from photographic development waste solution is provided. In the process, a silver bearing emulsion layer coated on the surface of the photographic film is dissolved in the waste solution which is in turn subjected to an electrolysis treatment to recover metallic silver therefrom.

7 Claims, No Drawings

RECOVERY OF SILVER FROM PHOTOGRAPHIC FILM AND PHOTOGRAPHIC DEVELOPMENT WASTE SOLUTION

FIELD OF THE INVENTION

The present invention relates to a process for recovering silver from a photographic film and a photographic development waste solution, particularly to a process in which the photographic development waste solution is used for removing silver halides from the photographic film.

BACKGROUND OF THE INVENTION

U.S. Pat. No. 3,960,550 discloses a process for recovering silver from a photographic film having a polymer base and a silver bearing emulsion layer coated thereon comprising immersing and washing the photographic film in a bleach solution of sodium hypochloride until the silver bearing emulsion layer is removed from the polymer base and disposed in said solution; introducing sodium hydroxide into said solution to precipitate said silver and adding a flocculating agent into said solution to settle said precipitate to a lower strata of said solution in the form of sludge; separating the sludge from the solution; drying and heating the sludge into a hard cake; pulverizing the cake and heating the pulverized cake to melt silver therefrom. In this process, a bleach solution is prepared for removing silver halides from the photographic film; in addition, several chemicals are utilized to obtain the silver containing sludge, which not only increase the silver recovering costs, but create additional pollutions.

U.S. Pat. No. 4,799,954 discloses a process for the recovery of silver from a photographic film comprising using a caustic alkali solution at elevated temperatures with high shear to remove silver halides from the film and reduce the silver halides to metallic silver; separating the silver containing solution from the film; and acidifying the silver containing solution to separate the metallic silver. This process also suffers the same disadvantages as those mentioned in U.S. Pat. No. 3,960,550, because several chemicals are required for recovering silver from the photographic film.

In developing photographic films or photographs, certain chemicals in the form of solution are used, and the waste solutions generated therefrom are detrimental to the environment, and thus require treatments before being discarded. Photographic development waste solutions are generally subjected to an electrolysis treatment for reducing silver ions contained therein to metallic silver, and then the electrolysis treated solutions are subjected to conventional waste water treatments to reduce the COD value and enhance the clarity.

An object of the present invention is to provide a process which can recover silver from a photographic film and a photographic development waste solution at the same time.

Another object of the present invention is to provide a process for separating a silver bearing emulsion layer from a photographic film, in which a photographic development waste solution is used to remove the silver bearing emulsion layer from the film.

Still another object of the present invention is to provide an improved process for recovering silver from a photographic development waste solution by electrolysis, in which a photographic film having a silver bearing emulsion layer coated thereon is immersed in the waste solution and the silver bearing emulsion layer is removed from the photographic film to the waste solution.

SUMMARY OF THE INVENTION

In carrying out the above objects, the process for recovering silver from a photographic film having a polymer base and a silver bearing emulsion layer coated thereon and from a photographic development waste solution according to the present invention comprises a) mixing pieces of the film with the waste solution and stirring the mixture until the silver bearing emulsion layer is substantially removed from the polymer base; and b) separating the waste solution containing the removed silver bearing emulsion layer from the stripped film pieces.

The waste solution containing the removed silver bearing emulsion layer of step b) is further subjected to a treatment, such as electrolysis, to recover metallic silver therefrom.

As is well known to those skilled in the art, the efficiency of silver electrodeposition can be improved if the concentration of silver ions contained in the solution is increased. Therefore, the above step a) using a photographic development waste solution to strip the silver bearing emulsion layer from the polymer base not only avoids the above-mentioned drawbacks of U.S. Pat. Nos. 3,960,550 and 4,799,954, but improves the efficiency of silver electrodeposition from the photographic development waste solution.

DETAILED DESCRIPTION OF THE INVENTION

The process provided in present invention is the first process which incorporates the recovery of silver from photographic film into the recovery of silver from photographic development waste solution, in which the silver bearing emulsion layer coated on the surface of the photographic film is dissolved in the waste solution which is in turn subjected to a treatment, preferably electrolysis, to recover metallic silver therefrom.

The photographic film used in the present process has a polymer base, an adhesion promoting layer and a silver bearing emulsion layer, wherein the adhesion promoting layer such as vinylidine chloride polymer or copolymer is coated on the polymer base, and the light-sensitive silver bearing emulsion layer containing a silver halide is in turn coated on the adhesion promoting layer. The polymer base, used include biaxially oriented polyesters such as polyethylene terephthalate, cellulose acetate, or nitrocellulose. Particular examples of the photographic film are X-ray film, movie film and general photopicture film.

The photographic development waste solution used in the present process can include the waste solutions generated in film processing and in color or black-and-white photograph printing. The film may be X-ray film, movie film or general photopicture film. The film processing and photograph printing involve a sequence of procedures such as forming a silver image, fixing, bleaching, washing and drying. Preferably, the waste solution is generated in the fixing procedure.

The photographic film is preferably in the form of small pieces before mixing with the waste solution, so that a desired degree of mixing can be easily accomplished by stirring the mixture. A preferable range of the longest side of the film piece is about 2.0 to about 5.0 cm, for example a 2.5–3.5×2.5–3.5 cm² square. The mixing ratio of these film pieces to the waste solution is about 200–1000 pieces per liter of waste solution. The mixture is stirred at about 100–600 rpm at a temperature of 5°–90° C., preferably 15°–35° C., and for a period of 0.5–5.0 hours. In general, the silver bearing emulsion layer of the photographic film will be completely removed from the polymer base and disposed in the waste solution after the stirring. As a result, the silver content of the waste solution will increase about 15–25 wt %, and the electrodeposition of metallic silver from the waste solution containing the removed silver bearing emulsion layer will be more effectively carried out.

EXAMPLE 1

New X-ray films were exposed, developed, bleached, fixed, washed and then dried. The films were all cut into small pieces having a size of approximatly 2.5×2.5 cm², several of which were analyzed, the weights and silver contents thereof were found ranging from 0.16 to 0.17 g and 1.62 to 1.98 wt %, respectively. 400 small pieces of these X-ray films were immersed in 1.0 l color photograph printing waste solution having a silver ion concentration of 6050 mg/l, which consisted of equal percentages (volume) of used Kodak, Fuji and Konica fixing solutions, and the resulting mixture was thoroughly stirred that 300 rpm at room temperature for 2.0 hours. After the stirring, the silver ion concentration of the waste solution was increased to 7050 mg/l, and 99.7% of the small X-ray film pieces were recovered as the polymer base of the X-ray film.

EXAMPLE 2

500 small X-ray film pieces having a size of about 3.0×3.0 cm² were prepared from used X-ray films collected from the hospitals, and the silver contents thereof were found ranging from 1.49 to 1.90 wt %. These 500 pieces were immersed in 1.0 l of the color photograph printing waste solution and the mixture was stirred as same as the above Example 1. After the stirring, the silver ion concentration of the waste solution was increased from 6050 to 7242 mg/l, and 99.5% of the small X-ray film pieces were recovered as the polymer base of the X-ray film.

EXAMPLE 3

The waste solutions containing an increased silver ion content obtained in Examples 1 and 2 were separately subjected to an electrolysis treatment for reducing the silver ions contained therein to metallic silver. Moreover, the color photograph developing waste solution originally used in Examples 1 and 2 was also electrolyzed as a control.

The electrolysis cell used has 6 pieces of graphite plates (40 mm×180 mm) as the anode, and a stainless steel cylindrical tube having a diameter of 75 mm and a length of 50 mm as the cathode, in which the distance between the cathode and the anode is 10 mm. The electrolysis treatments were carried out under the following conditions:

Current: 2 A
Current Density: 2 A/dm²
Temperature: room temperature
Electrolysis Time: 1.5–2.0 hrs
Rpm of Cathode: 400.

The metallic silver recovered from these waste solutions had a purity of 98–99%. The results are shown in Table 1.

TABLE 1

| Conc. of $Ag^+$, mg/l | Eletrolysis Time, hr | Current Efficiency, % | Recovery of Ag, % |
| --- | --- | --- | --- |
| 6050[1] | 1.5 | 45.98 | 91.74 |
| | 2.0 | 36.33 | 96.69 |
| 7050[2] | 1.5 | 55.10 | 94.33 |
| | 2.0 | 42.92 | 98.01 |
| 7242[3] | 1.5 | 56.68 | 94.47 |
| | 2.0 | 44.11 | 98.07 |

[1] The color photographic development waste solution originally used in the Examples 1 and 2.
[2] Example 1.
[3] Example 2.

It can be understood from the above descriptions and embodiments that the present invention which integrates the recovery of silver from photographic films into the recovery of silver from photographic development waste solutions at least has the advantages of avoiding fresh raw materials being used and improving the electrolysis efficiency, which in turn enhance the opportunity of economic success in recovering silver from photographic films and photographic development waste solutions.

What is claimed is:

1. A process for recovering silver both from a photographic film having a polymer base with a silver bearing emulsion layer coated thereon and from a photographic development waste fixing solution containing substantial amounts of silver ions, comprising the steps of:
   (a) mixing pieces of the film with the waste fixing solution and stirring the mixture until the silver bearing emulsion layer is substantially removed from the polymer base;
   (b) separating the waste fixing solution containing both the silver bearing emulsion layer removed during step (a) and the substantial amounts of silver ions contained in the waste fixing solution before step (a) from the pieces of the film; and
   (c) subjecting the separated waste fixing solution to electrolysis to remove metallic silver therefrom.

2. A process according to claim 1, wherein the pieces of the film of step a) have the longest side thereof ranging from about 2.0 to 5.0 cm, and the mixing ratio of the film pieces to the waste solution is about 200–1000 pieces per liter of waste solution.

3. A process according to claim 2, wherein the mixture is stirred at about 100–600 rpm at a temperature of 15°–35° C. and for a period of 0.5–5.0 hours.

4. A process according to claim 1, wherein the photographic film is X-ray film, movie film or photopicture film.

5. A process according to claim 4, wherein the photographic film is X-ray film.

6. A process according to claim 1, wherein the photographic development waste solution is a waste solution generated in film processing or photograph printing.

7. A process according to claim 6, wherein the photographic development waste solution is a waste solution generated in a fixing procedure of the film processing or photograph printing.

* * * * *